(12) United States Patent
Caple et al.

(10) Patent No.: US 11,118,107 B2
(45) Date of Patent: *Sep. 14, 2021

(54) METHOD OF USING MICRO-PARTICLE AMORPHOUS SILICATE IN WELL STIMULATION

(71) Applicant: Oil Field Packaging LLC, Denver, CO (US)

(72) Inventors: Michael John Caple, Denver, CO (US); John Stabenau, Denver, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 17/024,707

(22) Filed: Sep. 18, 2020

(65) Prior Publication Data

US 2021/0095191 A1 Apr. 1, 2021

Related U.S. Application Data

(60) Provisional application No. 62/906,102, filed on Sep. 26, 2019.

(51) Int. Cl.
| | | |
|---|---|---|
| *E21B 43/267* | (2006.01) | |
| *C09K 8/92* | (2006.01) | |
| *C09K 8/66* | (2006.01) | |
| *C09K 8/80* | (2006.01) | |

(52) U.S. Cl.
CPC ............... *C09K 8/92* (2013.01); *C09K 8/665* (2013.01); *C09K 8/80* (2013.01); *C09K 8/805* (2013.01); *E21B 43/267* (2013.01)

(58) Field of Classification Search
None
See application file for complete search history.

(56) References Cited

U.S. PATENT DOCUMENTS

| | | | |
|---|---|---|---|
| 4,466,831 A * | 8/1984 | Murphey | C01B 33/325 106/600 |
| 6,169,058 B1 | 2/2001 | Le et al. | |
| 6,945,329 B2 | 9/2005 | Harris | |
| 7,207,386 B2 | 4/2007 | Brannon | |
| 7,726,399 B2 | 6/2010 | Brannon | |
| 7,861,780 B2 | 1/2011 | Stephenson | |
| 7,931,087 B2 | 4/2011 | Gupta | |
| 9,322,260 B2 | 4/2016 | Potapenko | |
| 9,366,098 B2 | 6/2016 | Wu | |
| 9,663,706 B2 | 5/2017 | Fu | |
| 9,896,903 B2 | 2/2018 | Fonseca Ocampos | |

(Continued)

*Primary Examiner* — Andrew Sue-Ako
(74) *Attorney, Agent, or Firm* — Will Hunziker

(57) ABSTRACT

A treatment additive for hydraulic fracturing made of heated silica to create amorphous silicate with a Mohs hardness between 4.5 and 6 and a particles distribution with maximum diameter between 5 and 2600 microns that has been heated and shaped into amorphous shapes with large surface area to weight ratio and ultra-low settling velocity used to prop microfractures distal from well bore, especially in low viscosity and high temperature wells. The microparticle size and shape allow the treatment to effectively hold microfractures open, stimulate backpressure, and prevent leakoff; which has the added benefit of improving primary fracture development; refrac and frac protect productivity; and reduces the likelihood of interference between offset wells. An additional benefit is that the treatment doesn't contain crystalline silica.

20 Claims, 4 Drawing Sheets

(56) References Cited

U.S. PATENT DOCUMENTS

| | | |
|---|---|---|
| 2006/0175059 A1 | 8/2006 | Sinclair |
| 2006/0258546 A1 | 11/2006 | Brannon et al. |
| 2013/0146292 A1 | 6/2013 | Litvinets |
| 2014/0228258 A1 | 8/2014 | Mahoney et al. |
| 2015/0369027 A1 | 12/2015 | Jones |
| 2016/0108713 A1 | 4/2016 | Dunaeva |
| 2016/0194944 A1 | 7/2016 | Walters |
| 2017/0066962 A1* | 3/2017 | Ravi .................. B01J 2/04 |
| 2017/0081585 A1 | 3/2017 | Bestaoui-Spurr |
| 2017/0166798 A1 | 6/2017 | Okamoto |
| 2017/0328171 A1 | 11/2017 | Payne |
| 2020/0231867 A1 | 7/2020 | Bestaoui-Spurr et al. |
| 2021/0095192 A1* | 4/2021 | Caple .................. C09K 8/92 |

* cited by examiner

Stoke's Law
$$v_s = \frac{(\rho_p - \rho_f)gd^2}{18\mu}$$
Fig. 1
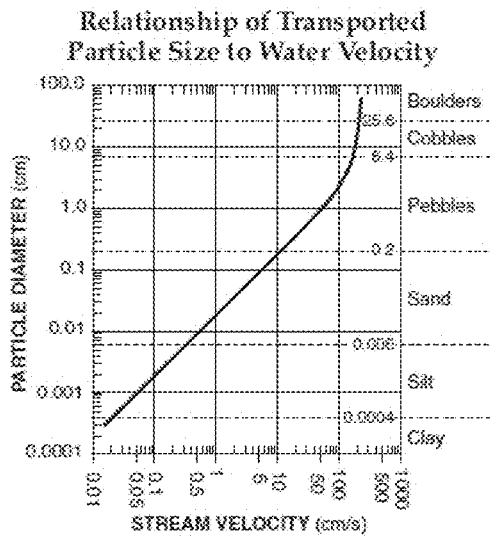
Fig. 2
Relationship of Particle Shape to Rate of Settling
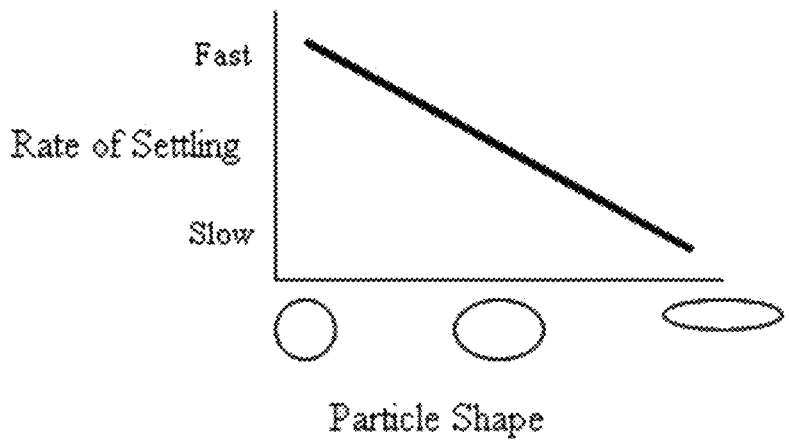
Fig. 3

METHOD OF USING MICRO-PARTICLE AMORPHOUS SILICATE IN WELL STIMULATION

CROSS REFERENCE TO RELATED APPLICATIONS

This application claims the benefit of U.S. Provisional Patent Application No. 62/906,102, filed on Sep. 26, 2019, titled "The Use of Micro-Particle Amorphous Silicate in Well Stimulation", which is incorporated by reference herein in its entirety for all purposes.

BACKGROUND OF THE INVENTION

1. Field of the Invention

The present invention is in the technical field of hydraulic fracturing, commonly called "fracking"; more particularly, the present invention pertains to the selection and use of additives for stimulating well production during hydraulic fracturing.

2. Description of Related Art

The treatment of subterranean formations penetrated by a well bore to increase the productivity of the well is known in the art. Various methods are known to achieve increased productivity from a subterranean formation. Such methods include well stimulation; both to initially stimulate a well, and to improve production from producing wells; formation stabilization; well bore cleanouts of producing wells; and the like. Regarding well stimulation, emphasis has been placed on hydraulically fracturing formations with various liquids, which may contain propping agents suspended therein.

During hydraulic fracturing, a fracturing fluid is injected into the wellbore at high pressures to create fractures in the rock formation surrounding the bore. The fractures radiate outwardly from the wellbore, typically from a few meters to hundreds of meters, and extend the surface area from which oil or gas drains into the well. When hydraulic pressure is applied to a subterranean formation by injection of a fluid into a well bore penetrating the formation, the pressure of the fluid creates tensile stresses in the rock of the formation. The stresses ultimately cause splitting, parting, or fracturing of the rock. The initially formed fracture or fractures can be extended in the formation by continued injection of fluid under sufficient pressure into the formation.

The fractures can be maintained in a partially open position by the placement of propping agents into the fractures or by acid etching techniques. When a propping agent is employed, it is introduced into the fracture in admixture with the treating fluid. When the pressure is released, the fractures in the formation close upon the etched faces of the fracture or the propping agent to create conductive surface area providing additional hydrocarbon connection far beyond the primary fracture network. The quantity of propping agent in the fluid is of significance because it can affect the width and height of the propped open fracture. The proppant concentration can be increased by admixing various gelling agents with the fluid used for stimulation; however, the presence of a viscosifying agent in the fluid further increases the quantity of mechanical energy required to create the fractures.

Hydraulic fracturing is typically employed to stimulate wells which produce from low permeability formations. In the absence of suitable stress boundaries, it is not uncommon during hydraulic fracturing for the fracture to grow substantially upward, as generally that is the path of least resistance due to less overburden pressure. Many different approaches have been used to minimize or avoid the occurrence of such phenomena including the development of modified perforating schemes and reduction in treatment rates.

The problem of undesirable fracture height growth may particularly be a problem when practicing slick water treatments, considering the poor transport properties of slick water fluids which allow proppants to settle, forming a "proppant bank" at the bottom of the created fracture. Fracture heights can often reach vertically three to four hundred feet during treatments. The majority of this newly created hydraulic geometry does not contain any proppant material due to gravity, lower energy transport environments, and lack of significant viscosity in the liquid medium carrying the proppant. It has been determined that these fractures are complex and depend upon primary geology, structure, and in-situ stresses. Fracture complexity of various combinations occur, often involving micro-fractures, which develop in the natural planes, or fractures in the formation or which are forced open during the treatment process. These newly created fractures are formed by the fracturing fluid and cannot become productive surface areas unless proppant is carried to the micro fractures and props them open, allowing the fracture to remain open for conduction of hydrocarbons after creation. Unfortunately, these unique fractures vary widely in size, height, and geometry and cannot be effectively infiltrated with traditional proppants, even traditional ultrafine mesh proppants.

The industry has been searching for years for something that can be carried more efficiently into low energy environments further from the wellbore covering more vertical areas of fracture created by the fluid and penetrate smaller and more complex fractures. The introduction of Micro-Particle Amorphous Silicate (MPAS) is used as a material to solve these issues and create higher productive value from well stimulations.

SUMMARY

The scope of the present invention is defined solely by the appended claims and detailed description of a preferred embodiment and is not affected to any degree by the statements within the summary below. Generally; a product, a product by process, and a method of use are described for the use of additives that stimulate well production in hydraulic fracturing that can effectively infiltrate microfractures both distal and vertical from a primary fracture geometry is described. The additive may be made of silicate with a Mohs hardness between 4.5 and 6 that has been heated above 1700 degrees Celsius and then crushed and screened to a particle distribution with a maximum diameter between 5 and 260 microns. The heating and crushing process turns the silicate particles into amorphous, irregular, shapes with large surface area to weight ratios and an ultra-low settling velocity useful in propping microfractures vertically distal from well bore, especially in low viscosity and high temperature wells. The microparticle size and shape allow the treatment to effectively plug microfractures, stimulate backpressure, and prevent leakoff; which has the added benefit of improving primary fracture development; refrac and frac protect productivity; and reduces the likelihood of interference between offset wells. An added benefit of the process of production is that the treatment no longer contains crystalline silica in quantities that are hazardous to the health of the handlers of the material.

OBJECTS AND ADVANTAGES

The present disclosure provides a number of advantages for hydraulic fracturing treatments, none of which must be entirely satisfied as they are non-exclusive alternatives and at least one of the following objects is met; accordingly, several objects and advantages of the present invention are:

(a) to provide a micro particle silicate treatment additive for use without harmful amounts of crystalline silica;

(b) to provide a hydraulic fracturing treatment additive that has a size distribution that is below standard proppant sizes and is capable of being carried further and prop smaller micro fractures and improving the productive geometry;

(c) to provide a hydraulic fracturing treatment additive material that reduces in size as pressure points during normal running conditions;

(e) to provide a hydraulic fracturing treatment additive material that is softer and less abrasive than standard proppants;

(f) to provide a hydraulic treatment fracturing additive material that has an amorphous shape with large surface area to weight ratio and low settling velocity;

(g) to provide a hydraulic fracturing treatment additive material that improves leakoff prevention by dehydrating fractures tips;

(h) to provide a hydraulic fracturing treatment additive material that makes refract and frac protect operations more productive; and (i) to provide a hydraulic fracturing treatment additive material that reduces interferences between off-set wells.

These and other objectives and advantages of the instant invention will become apparent from the following description taken in conjunction with the accompanying drawings.

BRIEF DESCRIPTION OF THE DRAWINGS

Various embodiments are described herein with reference to the following Drawings Certain aspects of the Drawings are depicted in a simplified way for reason of clarity. Not all alternatives and options are shown in the Drawings and, therefore, the Claims are not limited in scope to the content of the Drawings.

1. FIGURES

FIG. 1 illustrates a mathematical equation of Stokes' Law.

FIG. 2 illustrates a graph showing the general relationship between transported particle size and water velocity.

FIG. 3 illustrates a graph showing the general relationship between particle shape and rate of settling.

Figure 4:
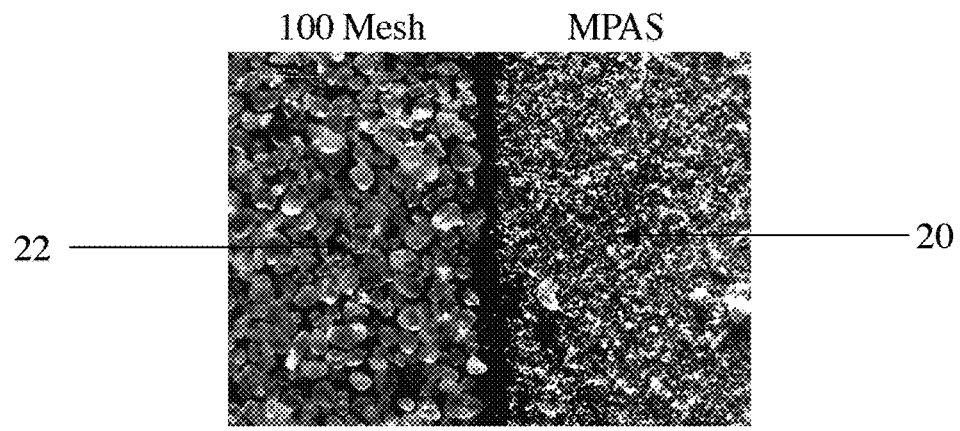

FIG. 4 illustrates Quartz 100 mesh and Micro-Particle Amorphous Silicate, made as described in an embodiment of the present disclosure.

Figure 5:
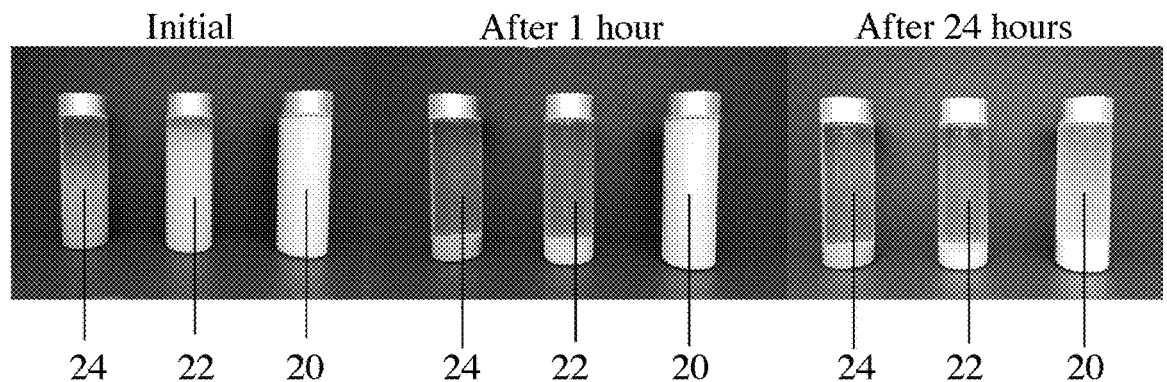

FIG. 5 illustrates images of Micro-Particle Amorphous Silicate produced as described above, Quartz 100 mesh, and Quartz 40/70 (24), after mixture, at 1 hour of static rest, and at 24 hours of static rest.

Figure 6:
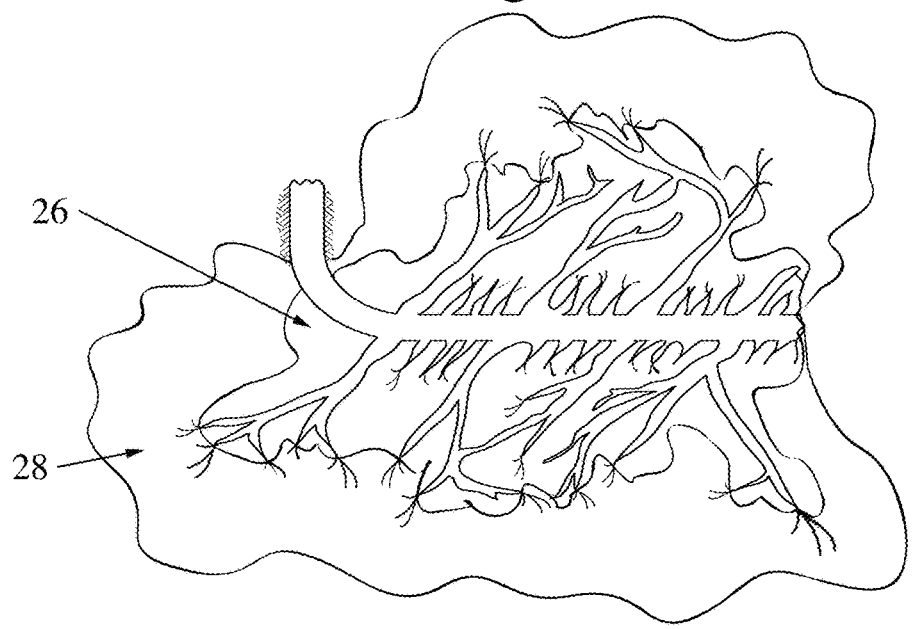

FIG. 6 illustrates well production after using a Micro-Particle Amorphous Silicate treatment, in accordance with an embodiment of the present disclosure.

Figure 7:
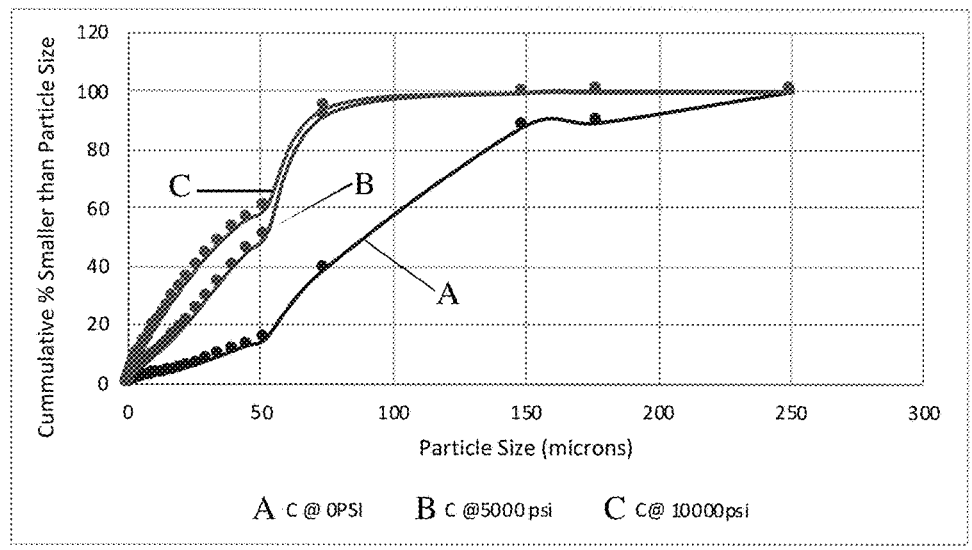

FIG. 7 illustrates a graph of the reduction of particle size after pressure and sheer forces are applied, in accordance with an embodiment of the present disclosure.

Figure 8:
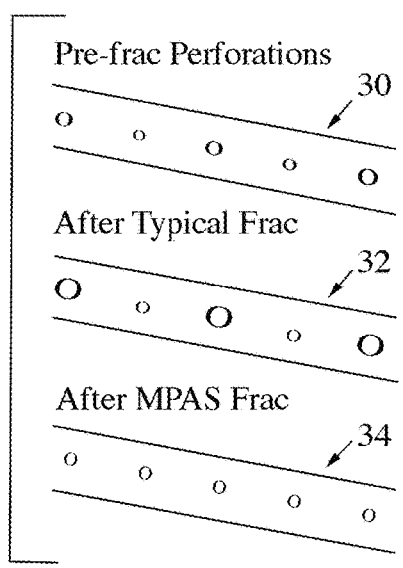

FIG. 8 illustrates the benefits of using Micro-Particle Amorphous Silicate's less abrasive materials, in accordance with an embodiment of the present disclosure.

Figure 9:
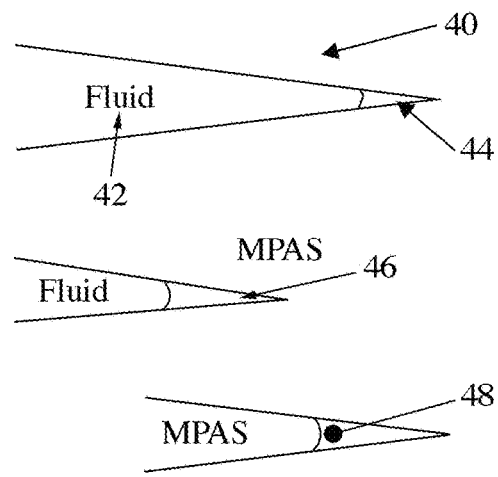

FIG. 9 illustrates the benefits of using Micro-Particle Amorphous Silicate for a dehydration process that limits the effects of leakoff, in accordance with an embodiment of the present disclosure.

Figure 10:
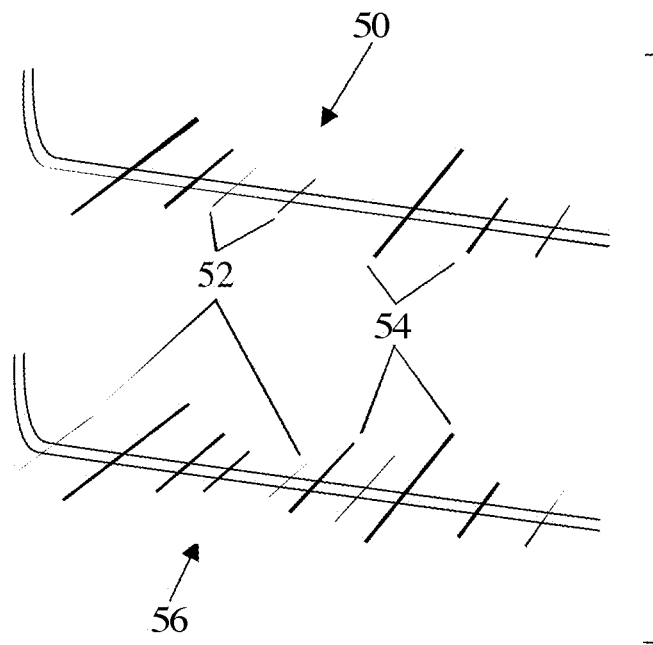
Figure 11:
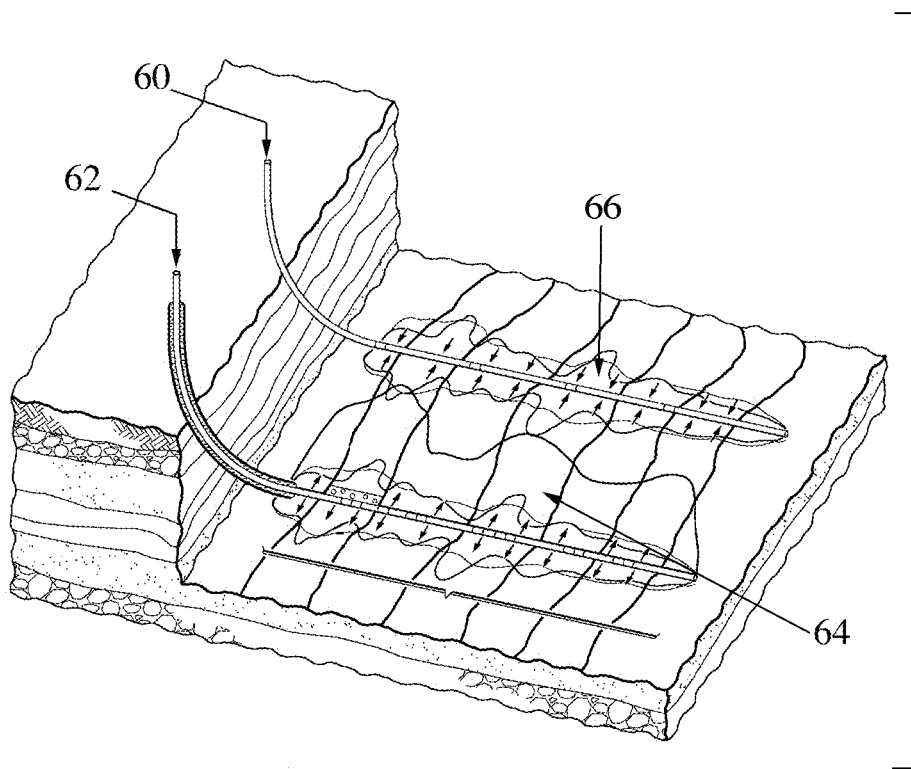

FIG. 10 illustrates the refrac benefits of using Micro-Particle Amorphous Silicate, in accordance with an embodiment of the present disclosure FIG. 11 illustrates the frac protect effect of using Micro-Particle Amorphous Silicate, in accordance with an embodiment of the present disclosure Corresponding reference characters indicate corresponding components throughout the several figures of the Drawings. Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiment are often not depicted in order to facilitate a less obstructed view of these various embodiments of the present disclosure.

2. REFERENCES

20 Micro-Particle Amorphous Silicate
22 Quartz 100 Mesh
24 Quartz 40/70
26 Productive Geometry of Well Created by Traditional Proppants
28 Productive Geometry of Well Created by Using Micro-Particle Amorphous Silicate
30 Completion Pipe Perforations in Pipe Prior To Fracking
32 Completion Pipe Perforations in Pipe After Fracking with Conventional Proppants
34 Completion Pipe Perforations in Pipe After Fracking with Micro-Particle Amorphous Silicate
40 Standard Fracture
42 Slurry
44 Apertures
46 Leakoff
48 Micro-Particle Amorphous Silicate Blocking Aperture And Leakoff
50 Depleted Well After Production
52 Producing Fractures
54 Non-Producing Fractures
56 Well After Refrac With Micro-Particle Amorphous Silicate
60 Well Fractured with Micro-Particle Amorphous Silicate
62 Well Fractured with Traditional Proppants
64 Longer Primary Fractures
66 Shorter Primary Fractures

DETAILED DESCRIPTION

The following description is not to be taken in a limiting sense but is made merely for the purpose of describing the general principles of exemplary embodiments, many additional embodiments of this invention are possible. It is understood that no limitation of the scope of the invention is thereby intended. The scope of the disclosure should be determined with reference to the Claims. Reference throughout this specification to "one embodiment," "an embodiment," or similar language means that a feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

Further, the described features, structures, or characteristics of the present disclosure may be combined in any suitable manner in one or more embodiments. In the Detailed Description, numerous specific details are provided for a thorough understanding of embodiments of the disclosure. One skilled in the relevant art will recognize; however, that the embodiments of the present disclosure can be practiced without one or more of the specific details, or with other methods, components, materials, and so forth. In other instances, well-known structures, materials, or operations are not shown or described in detail to avoid obscuring aspects of the present disclosure. Any alterations and further modifications in the illustrated devices, and such further application of the principles of the invention as illustrated herein are contemplated as would normally occur to one skilled in the art to which the invention relates.

The phrases "at least one," "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. The terms "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

For the purposes of promoting an understanding of the principles of the present invention, reference will now be made to the embodiments illustrated in the drawings and specific language will be used to describe the same.

As described in the prior art section above, the problem of proppant transport up the primarily vertical fractures created in hydraulic fracturing of low permeability formations with or without slick water treatments is a well-known problem in the art of hydraulic fracturing. The majority of the newly created hydraulic fractured geometry typically does not contain any proppant material after treatment due to gravity, lower energy transport environments, and lack of significant viscosity in the liquid medium carrying the proppant. It has been determined that these fractures are complex and depend upon primary geology, structure, and in-situ stresses. It's widely accepted that the hydraulic surface area created during the fracturing process is significantly larger than the effective propped area. Fracture complexity of various combinations occur, often involving micro-fractures which develop in the natural planes, fractures in the formation, or are forced open during the treatment process and increase the overall formation surface area significantly above the dominate fracture geometry. These newly created fractures are formed by the fracturing fluid and cannot become productive surface areas unless proppant is carried into the micro-fractures and prop them open, allowing the fracture to remain open for conduction of hydrocarbons after creation. This increased conductive surface area provides additional hydrocarbon connection far beyond the primary fracture network. These unique fractures vary widely in size, height, geometry, and cannot be effectively infiltrated with traditional or ultrafine mesh proppants. Presently, a new solution to this problem is described.

A few general principles need to be explained in order to illustrate the solution to these problems. It is known that settling velocity of sediment particles is critical for accurately modeling sediment transport. The settling velocity can be determined by several factors. Slick water fracturing in shale reservoirs usually involves low proppant concentrations and the proppant settling is often predicted using the relatively simple Stokes' Law. Stokes' Law expresses the settling velocity of a small-spherical particle in a stagnant fluid and is mathematically expressed as shown in FIG. 1; where: vs=particle settling velocity, m/se; $\varrho_p$=density of the particle, kg/m3; $\varrho_f$=density of the carrier fluid, kg/m3; g=acceleration due to gravity, m/sec2; d=diameter of the particle, m=viscosity of the carrier fluid, Pa*sec or kg/m-sec. In practice, actual settling velocity is generally faster than predicted by Stokes' Law and use of Stokes' Law is often found to over-predict propped or effective fracture lengths by 100% to 300%.

One important reason for this is that Stokes' Law doesn't take into account water velocity. FIG. 2 illustrates a generalized graph showing the water velocity needed to maintain, but not start, movement of particles of various diameters; however, variations occur due to differences in particle density and shape; neither of which are taken into account by Stokes' Law. From FIG. 2 it becomes apparent that as the velocity of the stream slows down, larger particles settle first. FIG. 3 illustrates a simplified graph showing the relationship of particle shape to settling velocity: which is generally that rounder, more spherical particles settle faster than flat, angular, or irregularly shaped particles with low weight to surface area ratio. Hydrodynamics is similar to aerodynamics in that the inherently larger surface areas of irregular surfaces create friction and drag within the carrier fluid allowing the particle to settle more slowly, especially in low shear transport conditions. Conversely, denser objects of the same basic size and shape will displace fluid more quickly and settle faster.

Thus, in order to produce a hydraulic fracturing treatment additive with a minimum settling rate you would want particles of a minimum size, minimum density, and an amorphous (irregular) shape with maximum drag to be carried the furthest by the thinnest liquid to prop the smallest holes the furthest from the primary fractures. Micro-Particle Amorphous Silicate (MPAS) produced and used as described herein solves these long-standing challenges, thereby producing more productive well stimulations.

As illustrated in FIG. 4, the structure of the Micro-particle Amorphous Silicate (20) described herein is not that of conventional micro particles, such as 100 mesh Quartz (22), used in hydraulic fracturing completion processes, which are generally composed of rounded, spherical shapes. The Micro-particle Amorphous Silicate described herein is comprised of particles that are generally irregular in shape, such as: slivers, flat squares, or small planes; that are not generally spherical. This allows the material to have a low weight to surface area ratio and stay suspended in fluid much longer even under static and near laminar flow conditions. This is especially important at greater distances, especially vertical distances, from the wellbore where the velocity of the flow and energy of the fracture reduces dramatically. Additionally, when pressure has been released and the Micro-particle Amorphous Silicate operates as a proppant, the irregular slivers, flat squares, or small planes shape of the Microparticle Amorphous Silicate are more likely to plug the fracture it props, thereby preventing leakoff and changing primary fracture geometry.

The amorphous shapes of the micro-particle silicate are produced, in part, by first heating the silicate above 1700 degrees Celsius; at which point it becomes a liquid; and then cooling the silicate; this phase shift changes the resulting geometry of the rock when it is crushed; making it much less likely to be round-in essence it shatters instead of crumbles. An amorphous, in chemistry, crystallography and, by extension, to other areas of the natural sciences is a substance or feature that lacks an ordered form. In the context of this patent, amorphous means the particles are no longer generally rounded or spherical and have become irregular in their shape and include many slivers, flat squares, or small planes shapes among others.

An unexpected benefit of this heating process is that the Micro-particle Amorphous Silicate contains little to no detectable amounts of respirable crystalline silica after it is crushed—those respirable particles are turned into liquid and bond together, then once crushed, they tend to shatter instead of rub off into fine powders; in some cases no producing any detectable amounts of air born crystalline silica. In one embodiment, the additive does not contain respirable crystalline silica that becomes airborne in concentrations of over 25 Micrograms per Cubic Meter of air when use; in another embodiment, the silicate particles do not contain crystalline silica that becomes airborne in concentrations of over 50 Micrograms per Cubic Meter of air when use; both of which follow OSHA guidelines for worker safety while using the material; protecting users from disability and death from: lung cancer; chronic obstructive pulmonary disease (COPD); and kidney disease.

The greater suspension of Micro-particle Amorphous Silicate is also achieved, in part, because the particle size is much smaller than standard silicate quartz proppants, such as those processed through a 40/70 or 100 mesh screen, allowing it to have a much lower settling velocity. Micro-particle Amorphous Silicate is different from conventional proppant treatments because the vast majority of its particle range is below 70 microns maximum diameter; which dramatically decreases the settling velocity; allowing for use without the additional viscosifying agents that would normally be required for effective transport of traditional proppants—which makes it an ideal choice for use in high temperature wells and slick water treatments.

The silicate particles are first selected from large aggregate amorphous silicate, then then heated above 1700 degrees Celsius; then crushed in a ball mill into shards and then screened to the desired size range and size distribution. The final product is a Micro-Particle Amorphous Silicate that has a Mohs hardness between 4.5 and 6 and is chemically inert and non-reactive.

In one embodiment of the invention a Micro-Particle Amorphous Silicate treatment for hydraulic fracturing is made of particles wherein at least 97% of the particles comprise sizes between 5 and 2,600 microns in maximum diameter. In another embodiment, the Micro-Particle Amorphous Silicate treatment may have a size distribution wherein at least 51% of the particles have maximum diameters between 100 and 850 microns. In yet another embodiment, the Micro-Particle Amorphous Silicate treatment may have a size distribution wherein at least 75% of the particles have maximum diameters between 40 and 1,000 microns.

The Micro-Particle Amorphous Silicate treatment may have a size distribution wherein: less than 9% of the Micro-Particle Amorphous Silicate is larger than 150 microns in maximum diameter, 39% is smaller than 50 microns in maximum diameter and at least 17% is smaller than 5 microns in maximum diameter. In another embodiment, the Micro-Particle Amorphous Silicate treatment may have a size distribution wherein less than 20% of particle size distribution is larger than 150 microns in maximum diameter, 20% or more is below 50 microns in maximum diameter, and at least 5% is smaller than 5 microns in maximum diameter. In yet another embodiment, the Micro-Particle Amorphous Silicate treatment may have a size distribution wherein less than 30% of particle size distribution is larger than 150 microns in maximum diameter, 5% or more is below 50 microns in maximum diameter, and at least 1% is smaller than 20 microns in maximum diameter.

These size distribution ranges of the Micro-Particle Amorphous Silicate allows for the effective placement of proppant in a fracture and has a dominant effect on well productivity. FIG. 4 shows Micro-Particle Amorphous Silicate produced as described above (20) next to standard Quartz 100 mesh (22) proppant, illustrating the differences in size and shape.

Proppant concentration and the ratio of proppant diameter to fracture width govern the relative velocity of both proppant and fluid. With regard to proppant diameter, which is also related to settling velocity; the smaller particles in the 20-50 Micron maximum diameter range allow the material to enter fractures of less than 0.002 inches in diameter; which is the minimum size determined as the width of micro fractures. Non-dominate cleaved, induced, associated, and horizontal fractures created while developing the dominant fractures are typically between 50 and 260 microns in maximum diameter, or 0.01 inches; which is the same general range of diameter of the Micro-Particle Amorphous Silicate itself, allowing for maximum propping of the fractures. Dominant fractures created during hydraulic fracturing are generally agreed to be in the 0.15 to 0.30-inch range and are propped with conventional proppant materials. The size distribution of Micro-Particle Amorphous Silicate allows for a natural sorting of material as it passes from main fracture, to smaller associated fractures, to micro fractures. The larger particle range of Micro-Particle Amorphous Silicate over traditional proppants allows the Micro-Particle Amorphous Silicate to be useful in vertical height growth coverage not normally propped by conventional proppants.

FIG. 5 shows three bottles of water with Micro-Particle Amorphous Silicate (MPAS) produced as described above (20) in one bottle, Quartz 100 Mesh (22) in another bottle, and Quartz 40/70 (24) in a third bottle, all have been mixed and left to settle. The left set of 3 bottles show the bottles immediately after mixture, the center set of three bottles show the bottles after 1 minute, and the right set of three bottles show the bottles after 24 hours. All three bottles show Micro-Particle Amorphous Silicate produced as described above (20) clearly staying suspended in the water 24 hours later better than Quartz 40/70 (24) was suspended immediately after mixture, and better than Quartz 100 mesh (22) was an hour after mixture. Because of its size and surface to weight ratio, Micro-Particle Amorphous Silicate produced as described above can be carried and suspended much more freely than conventional proppants, allowing greater well production as illustrated in FIG. 6 where the productive geometry of well created by traditional proppants is shown in the area (26) and the productive geometry of well created by Micro-Particle Amorphous Silicate using in conjunction with traditional proppants is shown in the area (28).

Because of the minimal conductivity of unconventional reservoirs today (0.001 Darcy), any micro-particles left in the fracture would have significantly higher conductivity than the source rock. Because the hydraulic area created during a stage of treatment can be so large (approximately 7,200,000 ft^2) achieving some effective flow capacity from it has substantial benefits to production; sometimes as much as a 40% increase in productivity. Micro-Particle Amorphous Silicate can also add productivity from any micro or associated fractures created during the well stimulation, achieving entry into these remote 0.01 to 0.001-inch width fractures.

It has been found through testing, that because Micro-Particle Amorphous Silicate is relatively soft, light, and flat in shape that it prone to reducing in size under the force and shear normal to the hydraulic fracturing process, thereby further increasing its ability to stay suspended longer and penetrate deeper into fractures than conventional materials. As seen in FIG. 7, testing showed that after 5,000 psi of pressure was applied, the Micro-Particle Amorphous Silicate particles 100 microns in diameter or smaller went from 59% to 95% of the total material. Testing also showed after 5,000 psi pressure that particles 50 microns in maximum diameter or smaller went from 18% to 49% of the total material. Having a greater concentration of smaller particles available in suspension within the fracture provides more material to the micro fractures while also not causing detrimental blockage in major fractures caused by larger particles; allowing the smaller particles to stay suspended in the fluid longer and have a greater opportunity to cover a lager hydraulic area—especially vertically in fractures.

When perforations are created through the process of using perforation guns, they are uneven and irregular; in some cases, there can be fully designed perforation diameter geometries down to fractions of an intended diameter; keeping those perforations correctly proportioned is key to even distribution of proppant and creating more efficient well completions. Because the Micro-Particle Amorphous Silicate produced as described above has a Mohs hardness between 4.5 and 6, and in part because it is non-reactive, it has a low abrasive capacity and doesn't manipulate primary perforation dimensions as readily as conventional proppants. Conventional proppants are generally in the 7.0 to 9.5 range of Mohs hardness and can dramatically change initial pipe perforation geometries early in a treatment, thereby dramatically changing distribution of the proppants because when highly abrasive silica sand is applied as the first material that contacts the irregular steel orifices, there is a highly differential preference to erode the already larger completion pipe perforations, exacerbating the issue of uneven proppant distributions. Once perforation erosion happens, differential pressure and uneven distribution of proppant through the perforations is nearly impossible to manage.

The Micro-Particle Amorphous Silicate produced as described above is roughly 60% and 70% less abrasive than conventional proppants, such as Quartz 100 Mesh (22), and can have a measurable and significant effect on residual conductivity of hydraulic geometry created that would otherwise be left without any material during or after fracture closure. Micro-Particle Amorphous Silicate, when used in treatments before typical silica sands, can extend the life of the designed perforation back pressure by allowing perforations to erode more evenly and less aggressively while also creating abrasion near wellbore and fracturing the formation more evenly.

FIG. 8 shows three sets of perforations in completion pipes, the top pipe shows perforations prior to fracking (30) where the perforations are naturally slightly different as created by the perforation gun, the middle pipe shows perforations after fracking with conventionally abrasive proppants (32) where the larger holes have become even larger and the bottom pipe shows perforations in pipe after fracking with Micro-Particle Amorphous Silicate (34) where the perforations are mostly the same as pre frac. As can be seen, when using Micro-Particle Amorphous Silicate, the perforations remain closer in diameter to each other as is expected when abrasion preference for larger holes has been limited by using a softer material with a lower settling velocity.

Micro-Particle Amorphous Silicate produced as described above can be used as an additive to any current completion design. Micro-Particle Amorphous Silicate produced as described above may come in 3,000-pound super sacks and 50-pound sacks that can be transferred into any "box" system and integrated into those systems. It is recommended that three to nine thousand pounds of are Micro-Particle Amorphous Silicate is run right before the designed proppant schedule. The Micro-Particle Amorphous Silicate can be run at any concentration but should be generally be in the range of between 0.1 and 4 pounds per gallon. Within this range, convenience is the key to operational efficiency. A practical, gentle ramp with a fluid volume that is at least twice the gallons as pounds run can be used, such as 3,000 pounds of Micro-Particle Amorphous Silicate should run in at least 6,000 gallons, etc. In one preferred embodiment, 50 to 150,000 thousand pounds are run during a stage of well completion; with 100 to 20,000 pounds run right before a designed proppant schedule, and one to 10,000 pounds run intermittently throughout the remaining treatment.

3,000-pound super sacks of Micro-Particle Amorphous Silicate can be placed above a blender hopper, gently dumped, and then followed by the proppant scheduled to be run next. If Micro-Particle Amorphous Silicate is placed in a "box" system, the box can be loaded up to 40,000 pounds at a time. The Micro-Particle Amorphous Silicate is then rationed into each completion stage. If needed, the Micro-Particle Amorphous Silicate "box" can then be removed for the rest of the stage and placed on the box stand before the next treatment begins. After the initial volume of Micro-Particle Amorphous Silicate is run at the beginning of the stage to achieve a high distribution in the primary created hydraulic geometry, 50-pound bags of Micro-Particle Amorphous Silicate can be added intermittently throughout the treatment as well. These bags can be added by hand and just dumped into either the blender hopper or blender tub. The Micro-Particle Amorphous Silicate is added and mixed along with the regular proppant, with the Micro-Particle Amorphous Silicate diluting and distributing where conventional proppants cannot go. It is up to the operator on total volumes used and maximizing the utility of the material.

Often during hydraulic fracturing of reservoirs, micro fractures and near well-bore complexity can cause the fluid to leakoff into undesirable geometries, causing loss of pressure in the fracture and ultimately the well productivity. Elements of this are often call Pressure Dependent Leakoff (PDL) or tortuosity. Not managing Pressure Dependent Leakoff or tortuosity in these treatments can cause premature pressure out or screen outs. Micro-Particle Amorphous Silicate can penetrate fracture apertures in the range of 0.01 to 0.001 inches, causing blockages in the tip and preventing pressure loss. The Micro-Particle Amorphous Silicate used in this dehydration process limits the effects of leakoff while increasing pressure in the major fracture, increasing the probability that the fracture becomes longer and more productive.

FIG. 9 illustrates how Micro-Particle Amorphous Silicate dehydrates a slurry. In a standard fracture (40) with a slurry (42), fracture extension may occur in the fracture apertures (44), potentially in the range of 0.01 to 0.001 inches, which traditional proppants cannot reach, both because the proppants are too large and because they settle too quickly; allowing the slurry (42) to leakoff (46). Micro-Particle Amorphous Silicate (20) can reach these apertures (40) and clog them (48), thereby creating more pressure diversion into the primary fractures, creating complexity, limiting fracture lengths, and improving well production.

The same effects of Micro-Particle Amorphous Silicate described above are also effective in re-frac and frac protect operations. Refrac is done to wells as their production life ages. It is done for a variety of reasons, sometimes because of acute well issues, but generally to create additional productive area by re-stimulating an earlier frac and trying to create new frac geometry along the well bore. In almost every case, the frac rates for these operations are dramatically less than initial and conventional frac rates. Because of the fine particle size of Micro-Particle Amorphous Silicate, it can be carried into the wellbore and formation much more effectively that conventional proppants. Additionally, the Micro-Particle Amorphous Silicate's ability to limit the effects of leakoff aids in shutting off areas that have already produced the most hydrocarbon and consequently have the largest pressure reduction, thereby encouraging frac growth in either unfractured areas of the wellbore or areas of pressure depletion and minor production.

FIG. 10 illustrates the use of Micro-Particle Amorphous Silicate in refrac operations. The top fracture geometry represents a typical depleted well after production (50) wherein the primary fractures in white are no longer productive (52) and the primary fractures in black are productive (54). The bottom fracture geometry (56) represents a typical refrac well using Micro-Particle Amorphous Silicate (52) wherein there is an expanded fracture geometry and where some of the primary fractures have become productive again.

Micro-Particle Amorphous Silicate has also been shown to be effective in protecting offset producing wells from completions completed next to those wells. Generally, this is known as Frac protect. It is not desirable for wells drilled after primary wells to create fracture geometries that interfere with the production of pre-existing wells. These "frac hits" occur often and can permanently effect the production of other wells. By dehydrating the fracture tip, Micro-Particle Amorphous Silicate volumetrically manipulates fracture dimensions, thereby reducing fluidic fracture lengths making the primary geometries more evenly distributed locally, which then reduces interference between wells located close to each other.

FIG. 11 illustrates the usefulness of Micro-Particle Amorphous Silicate in protecting well fracture geometry from interfering with other local wells. A well that has the fracture geometry created by conventional proppants (62) is located next to a well that has fracture geometry created with the addition of Micro-Particle Amorphous Silicate (60). The primary fractures of the well created with conventional proppants tends to have a longer lateral geometry (64) that can interfere with nearby well primary structures, while the fracture geometry created using Micro-Particle Amorphous Silicate tends to have a shorter lateral geometry (66) that does not interfere with other nearby wells. These shorter primary fractures (66) are created because microfracture tips are plugged effectively, and perforations maintain their integrity longer creating more evenly distributed abrasion and pressure, which creates a more evenly distributed fracture geometry.

Information as herein shown and described in detail is fully capable of attaining the above-described object of the present disclosure, the presently preferred embodiment of the present disclosure; and is, thus, representative of the subject matter; which is broadly contemplated by the present disclosure. The scope of the present disclosure fully encompasses other embodiments which may become obvious to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the present disclosure.

What is claimed is:

1. A method of using a micro-particle amorphous silicate material for hydraulic fracturing comprising:
   selecting aggregate silicate;
   heating said aggregate silicate above 1700 degrees Celsius;
   cooling said aggregate silicate below 1700 degrees Celsius;
   crushing said aggregate silicate into amorphous particles;
   screening said particles until at least 97% of said particles have a maximum
   diameter between 5 and 2600 microns to produce a micro-particle amorphous silicate material; and
   running said micro-particle amorphous silicate material into a ground during a hydraulic fracturing treatment.

2. The method of claim 1, wherein said method increases hydraulically fractured well production by increasing an effective fractured area.

3. The method of claim 1, wherein said micro-particle amorphous silicate materials are screened so that less than 9% of particle size distribution is larger than 150 microns in maximum diameter; 39% or more is below 50 microns maximum diameter; and at least 17% is smaller than 5 microns in maximum diameter.

4. The method of claim 1, wherein said micro-particle amorphous silicate materials are screened so that less than 20% of particle size distribution is larger than 150 microns in maximum diameter, 20% or more is below 50 microns in maximum diameter, and at least 5% is smaller than 5 microns in maximum diameter.

5. The method of claim 1, wherein said micro-particle amorphous silicate materials are screened so that less than 30% of particle size distribution is larger than 150 microns in maximum diameter, 5% or more is below 50 microns in maximum diameter, and at least 1% is smaller than 20 microns in maximum diameter.

6. The method of claim 1, wherein said micro-particle amorphous silicate material particles reduce in size during the hydraulic fracturing treatment.

7. The method of claim 6, wherein a proportion of said micro-particle amorphous silicate material particles smaller than 100 microns in maximum diameter increase from below 60% to above 94% of total particles and particles smaller than 50 microns in maximum diameter increase from below 18% to above 49% of total particles after exposer exposure to 5,000 psi of pressure.

8. The method of claim 1, wherein said micro-particle amorphous silicate material is run at a concentration of between 0.1 and 4 pounds per gallon range.

9. The method of claim 1, wherein said micro-particle amorphous silicate material is used as an additive to any current completion design.

10. The method of claim 9, wherein 50 pounds to 150,000 thousand pounds of said microparticle amorphous silicate material is run during a stage of a well completion.

11. The method of claim 9, wherein 100 pounds to 20,000 thousand pounds of said microparticle amorphous silicate material is run before a remaining treatment with other proppant.

12. The method of claim 9, wherein fifty-pound bags of said micro-particle amorphous silicate material is run intermittently throughout a remaining treatment.

13. The method of claim 9, wherein one to 10,000 pounds of said micro-particle amorphous silicate material is run intermittently throughout a remaining treatment.

14. The method of claim 1, wherein said aggregate silicate is selected from a material with a Mohs hardness of between 4.5 and 6.

15. The method of claim 14, wherein said micro-particle amorphous silicate material is 60-70% less abrasive than quartz sand particles on completion pipe perforations.

16. The method of claim 1, wherein said method limits and prevents fluid loss and pressure dependent leakoff.

17. The method of claim 1, wherein said method increases hydraulic refracturing well production.

18. The method of claim 1, wherein said method reduces interference between off-set wells.

19. A method of using a micro-particle amorphous silicate material for hydraulic fracturing comprising:
  selecting aggregate silicate;
  heating said aggregate silicate above 1700 degrees Celsius;
  cooling said aggregate silicate below 1700 degrees Celsius;
  crushing said aggregate silicate into amorphous particles;
  screening said particles until at least 51% of said particles have a maximum
  diameter between 40 and 1,000 microns to produce a micro-particle amorphous silicate material; and
  running said micro-particle amorphous silicate material into a ground during a hydraulic fracturing treatment.

20. A method of using a micro-particle amorphous silicate material for hydraulic fracturing comprising:
  selecting aggregate silicate;
  heating said aggregate silicate above 1700 degrees Celsius;
  cooling said aggregate silicate below 1700 degrees Celsius;
  crushing said aggregate silicate into amorphous particles;
  screening said particles until at least 75% of said particles have a maximum
  diameter between 100 and 850 microns to produce a micro-particle amorphous silicate material; and
  running said micro-particle amorphous silicate material into a ground during a hydraulic fracturing treatment.

* * * * *